United States Patent
Barney et al.

(10) Patent No.: US 6,801,876 B2
(45) Date of Patent: Oct. 5, 2004

(54) METHOD AND APPARATUS OF MANAGING TIME FOR A PROCESSING SYSTEM

(75) Inventors: Dennis A. Barney, Morton, IL (US); Steven V. Christensen, Peoria, IL (US); Timothy A. Cross, Metamora, IL (US); Michael R. Lyons, Peoria, IL (US); Ron J. Penick, Forsyth, IL (US); Curtis V. Rocke, Metamora, IL (US); Christian A. Schreiner, Peoria, IL (US); April D. Scott, East Peoria, IL (US); David G. Young, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 198 days.

(21) Appl. No.: 09/732,545

(22) Filed: Dec. 8, 2000

(65) Prior Publication Data

US 2002/0072875 A1 Jun. 13, 2002

(51) Int. Cl.[7] .............................. G04F 1/00; G04F 10/00
(52) U.S. Cl. ........................................................ 702/178
(58) Field of Search ..................... 702/89, 178, 127; 713/400; 701/33, 35, 1, 110; 709/400, 232, 208, 248; 368/46, 55, 6; 700/78, 80

(56) References Cited

U.S. PATENT DOCUMENTS

| | | | | |
|---|---|---|---|---|
| 4,715,012 A | * | 12/1987 | Mueller, Jr. .................... 701/50 |
| 4,746,920 A | * | 5/1988 | Nellen et al. ............. 340/825.2 |
| 4,814,711 A | * | 3/1989 | Olsen et al. .................. 324/331 |
| 5,201,296 A | * | 4/1993 | Wunning et al. ............. 123/479 |
| 5,229,970 A | * | 7/1993 | Lee et al. .................... 365/222 |
| 5,481,456 A | * | 1/1996 | Ogura ............................ 701/1 |
| 5,519,726 A | * | 5/1996 | DiCarlo ...................... 375/224 |
| 5,555,171 A | | 9/1996 | Sonehara et al. |
| 5,579,513 A | * | 11/1996 | Strohmer ..................... 713/600 |
| 5,661,700 A | * | 8/1997 | Weppler ....................... 368/46 |
| 5,689,161 A | * | 11/1997 | Fugere et al. ............... 318/563 |
| 5,701,450 A | * | 12/1997 | Duncan ....................... 712/245 |
| 5,748,941 A | * | 5/1998 | Rabjohns ..................... 713/400 |
| 5,798,732 A | * | 8/1998 | Eshenbach ............. 342/357.12 |
| 5,848,028 A | * | 12/1998 | Burklin ........................ 368/46 |
| 5,887,029 A | * | 3/1999 | Husted et al. ............... 375/224 |
| 5,907,685 A | * | 5/1999 | Douceur ...................... 709/248 |
| 5,957,986 A | * | 9/1999 | Coverdill ...................... 701/33 |
| 5,958,060 A | * | 9/1999 | Premerlani .................. 713/400 |
| 5,983,143 A | * | 11/1999 | De Wille ........................ 701/1 |
| 5,983,302 A | * | 11/1999 | Christiansen et al. ........ 710/113 |
| 5,995,888 A | * | 11/1999 | Hagenbuch ................... 701/35 |
| 6,012,004 A | | 1/2000 | Sugano et al. |
| 6,023,667 A | * | 2/2000 | Johnson ....................... 702/183 |
| 6,038,685 A | * | 3/2000 | Bissett et al. .................. 714/12 |
| 6,069,887 A | * | 5/2000 | Geiger et al. ................ 370/338 |
| 6,138,065 A | * | 10/2000 | Kramer ....................... 701/29 |
| 6,236,277 B1 | * | 5/2001 | Esker ........................... 331/14 |
| 6,308,280 B1 | * | 10/2001 | Joseph et al. ............... 713/400 |
| 6,356,823 B1 | * | 3/2002 | Iannotti et al. ............... 701/35 |
| 6,370,161 B1 | * | 4/2002 | Ehrlich et al. .............. 370/516 |

* cited by examiner

*Primary Examiner*—John Barlow
*Assistant Examiner*—Demetrius R. Pretlow
(74) *Attorney, Agent, or Firm*—W Bryan McPherson; Robin Fahlberg

(57) ABSTRACT

The present invention includes a method and apparatus of managing time for a processing system located on a machine. The processing system includes a plurality of controllers and a communication network connecting each of the controllers. Each of the controllers has a local clock. The method includes the steps of establishing an operating characteristic of the machine, determining whether to update a local time in response to said operating characteristic, and updating said local time based upon the local clock in response to said update determination.

38 Claims, 4 Drawing Sheets

METHOD AND APPARATUS OF MANAGING TIME FOR A PROCESSING SYSTEM

TECHNICAL FIELD

The present invention relates generally to time management, and more particularly, to a method and apparatus of managing time for a processing system located on a machine.

BACKGROUND ART

Time management on a machine, such as an earth moving machine, is an important task. Time management on multi-processor systems is needed both for coordinated event logging, and also to ensure the controllers perform coordinated tasks at the appropriate time. Some systems, such as that disclosed in U.S. Pat. No. 6,012,004, attempt to have all of the controllers operate in lock step with each other. For example, the system may utilize one clock, located on a controller, such as a master controller. The master controller may determine the time and distribute the time to the other controllers. Without a local clock, the other controllers have no concept of time except what is delivered to them from the master controller. Therefore, keeping time with a desired resolution places a burden on the communication network. In addition, failures such as to the communication network or master controller, either temporary or long term, disrupts time management for the system because time updates are not performed. Therefore, time management is ineffective when failures occur.

The present invention is directed to overcome one or more of the problems set forth above.

DISCLOSURE OF THE INVENTION

In one aspect of the present invention, a method of managing time for a processing system located on a machine is disclosed. The processing system includes a plurality of controllers, each controller having a local clock. The processing system also includes a communication network connecting each of the controllers. The method includes the steps of, establishing an operating characteristic of the machine, and updating the local time of a controller in response to the operating characteristic.

In another aspect of the present invention, an apparatus configured to manage time on a processing system located on a machine is disclosed. The apparatus comprises a plurality of controllers, a local clock located on each controller and configured to update a local time, a communication network connected to the controllers, wherein each of the plurality of controllers are configured to establish an operating characteristic of the machine, and update the local time in response to the operating characteristic.

BEST MODE FOR CARRYING OUT THE INVENTION

Figure 1:
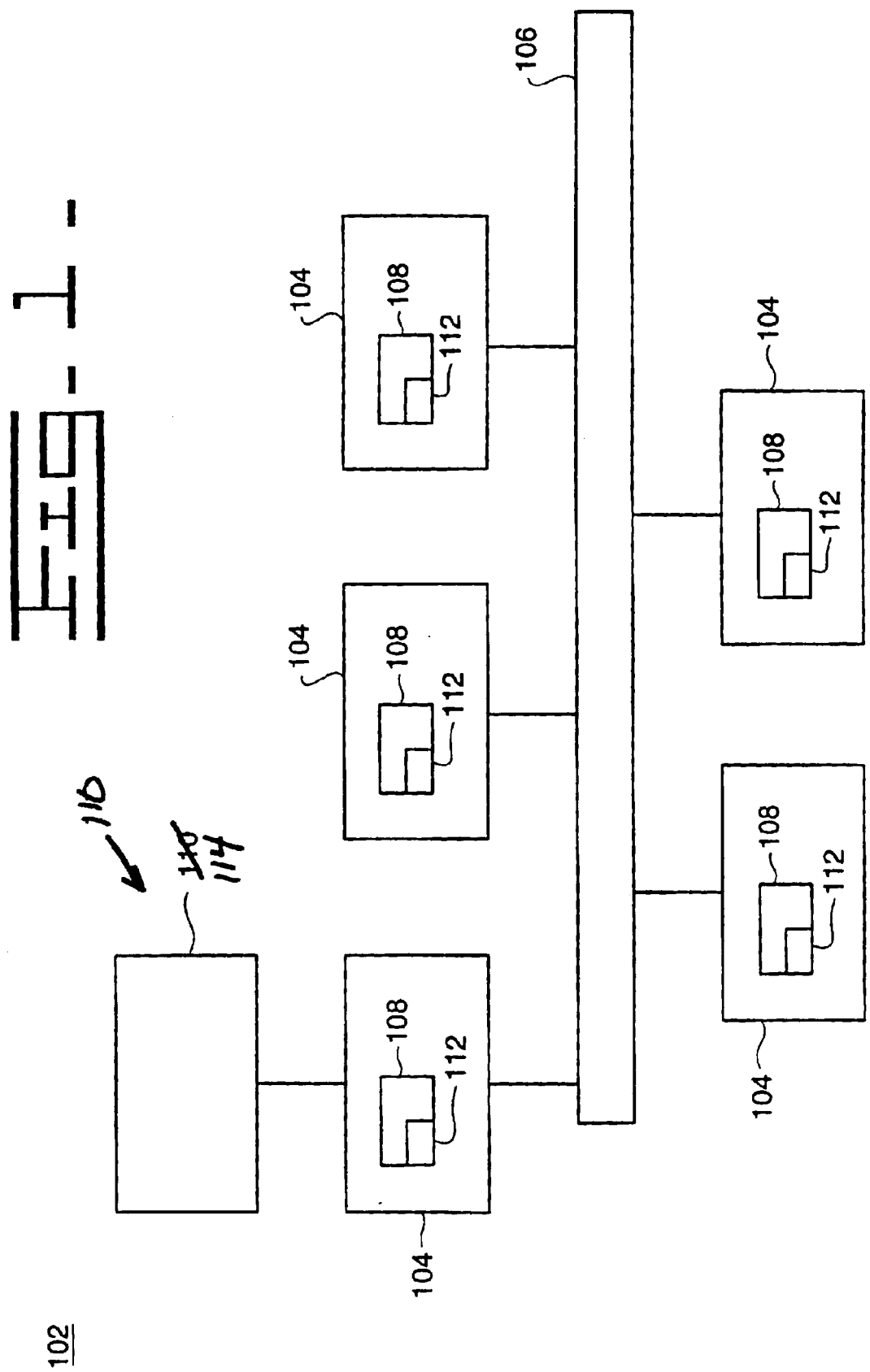
FIG. 1 is an illustration of one embodiment of a processing system.

The present invention provides a method and apparatus of managing time for a processing system located on a machine. FIG. 1 is an illustration of one embodiment of a processing system 102. In the preferred embodiment, the processing system 102 is located on an earth moving machine, however, the invention is equally applicable to other applications and machines such as generator sets, pumps, and stationary and marine engine applications.

The processing system 102 includes a plurality of controllers 104 connected to a communication network 106. Each of the controllers 104 includes a local clock 108. The local clock 108 determines and maintains a local time that is utilized by the controller 104, as will be discussed below. In this manner, the controller 104 is able to determine and maintain a local time, independent of external time related signals. The local clock determines a time value, or local time, by accumulating signals from a time base. The local clock may be implemented in hardware or software.

As mentioned, the local clock 108 includes a time base, or periodic signal generating device, such as an oscillator 112. Alternatively, if the oscillator 112 is not actually located within the clock, the oscillator 112 may still be located on the controller 104 and utilized by the local clock 108. In any case, the oscillator 112 generates a time base signal, i.e., a periodic signal of an established frequency. The time base signal is utilized by the local clock 108 to determine a local time.

In addition, each of the controllers 104 may be connected to one or more elements 110. In FIG. 1, the one or more elements is a speed sensor 114. In other embodiments element 110 may include one or more sensors, actuators, displays or other elements adapted to interact with a controller 104.

Each controller 104 in the processing system is configured to establish an operating characteristic of the machine, determine whether to update a local time in response to the operating characteristic, and update the local time using the local clock in response to the update determination.

Figure 2:
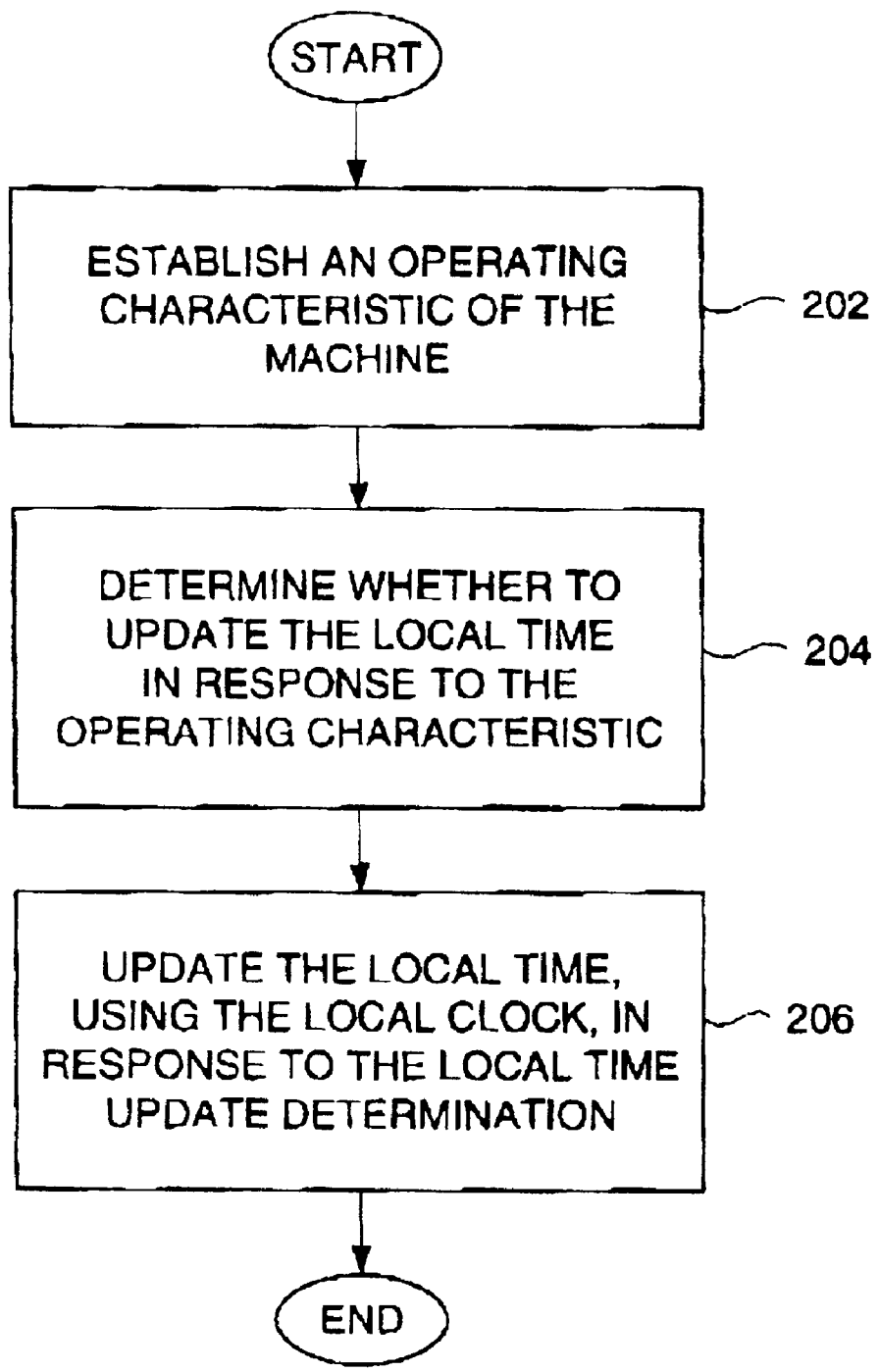
FIG. 2 is an illustration of one embodiment of a method of managing time for a processing system located on a machine.

FIG. 2 illustrates one embodiment of the method of the present invention. The present invention includes a method of managing time for a processing system 104 located on a machine. In a first control block 202 an operating characteristic of the machine is established. In the preferred embodiment, the operating characteristic is indicative of machine, or equipment operation, such as engine operation. Therefore, for example, the operating characteristic may be indicative of whether the machine engine is running, or stopped. In one embodiment a controller 104 may be connected to an element 110 that generates an operating characteristic signal. The element may be an engine speed sensor 114 or key switch (not shown). Other indications of machine operation include the engine oil pressure, or alternator activity, such as the alternator R terminal.

Therefore, the controller 104 may receive an operating characteristic signal from an element 110 and responsively establish the operating characteristic of the machine, e.g., whether the machine is operating. In an alternative embodiment, one or more of the controllers 104, e.g., such as a master controller if one is utilized, may establish the operating characteristic of the machine, and responsively broadcast the operating characteristic signal to the other controllers. The controller establishing the operating characteristic does not have to be the master controller. The receiving controllers 104 may receive the operating characteristic signal and responsively locally establish the operating characteristic of the machine, e.g., whether the machine is operating. Therefore, the operating characteristic signal is a signal indicative of the operating characteristic of the machine. In one embodiment, the operating characteristic signal may be a signal such as an engine speed signal received from an engine speed sensor 114. Alternatively, the operating characteristic signal may be a signal generated from one of the controllers, e.g., a master controller 104, which is indicative of the machine operation. In the event the operating characteristic signal is received from another controller 104, the signal may include a binary bit indicating the machine is either operating, or not operating. Therefore, the characteristic signal may be received from elements 110, or other controllers, and used to locally establish the operating characteristic of the machine.

In a second control block 204, each controller 104 determines whether to update the local time of the controller 104 in response to the established operating characteristic. As discussed, each controller 104 utilizes a local clock to determine and maintain a local time. In the preferred embodiment, the clock updates a local time in response to the operating characteristic indicating the machine is operating. Therefore, the local time is updated when the machine is operating, and is not updated when the machine is not operating.

The local time is used for several purposes, such as time tagging, logging events, such as diagnostic information and/or events, including fault diagnostics, or other controller 104 or system 102 related events. In one embodiment, the local time may be an indicator of the service hour meter of a machine, i.e., the number of hours the machine has been operated. Therefore, when the operating characteristic indicates the machine is operating, the controller 104 begins updating the local time, until the operating characteristic indicates the machine is no longer operating.

In a third control block 206, the local time is updated using the local clock, in response to the determination regarding whether the machine is operating. For example, when the operating characteristic signal indicates the machine is operating, the local clock updates the local time based upon the local time base signal generated by the oscillator 112. Therefore, the local time is determined and maintained by the local clock, when the machine is operating. When the machine is not operating, the local time is not updated, i.e., the local time does not change.

The clock utilizes the locally generated time base signal to update the time. For example, if the machine is operating, then the clock may be counting the periods of the time base signal, and updating the time in response to the counted periods. In one embodiment, one increment of the local time generated by the local clock may encompass multiple periods of the time base signal. When the machine is not operating, the time base signals are still being generated, but the local clock is not updating the time. The resolution of the local time is based upon the frequency of the local time base signal generated by the oscillator 112.

Figure 3:
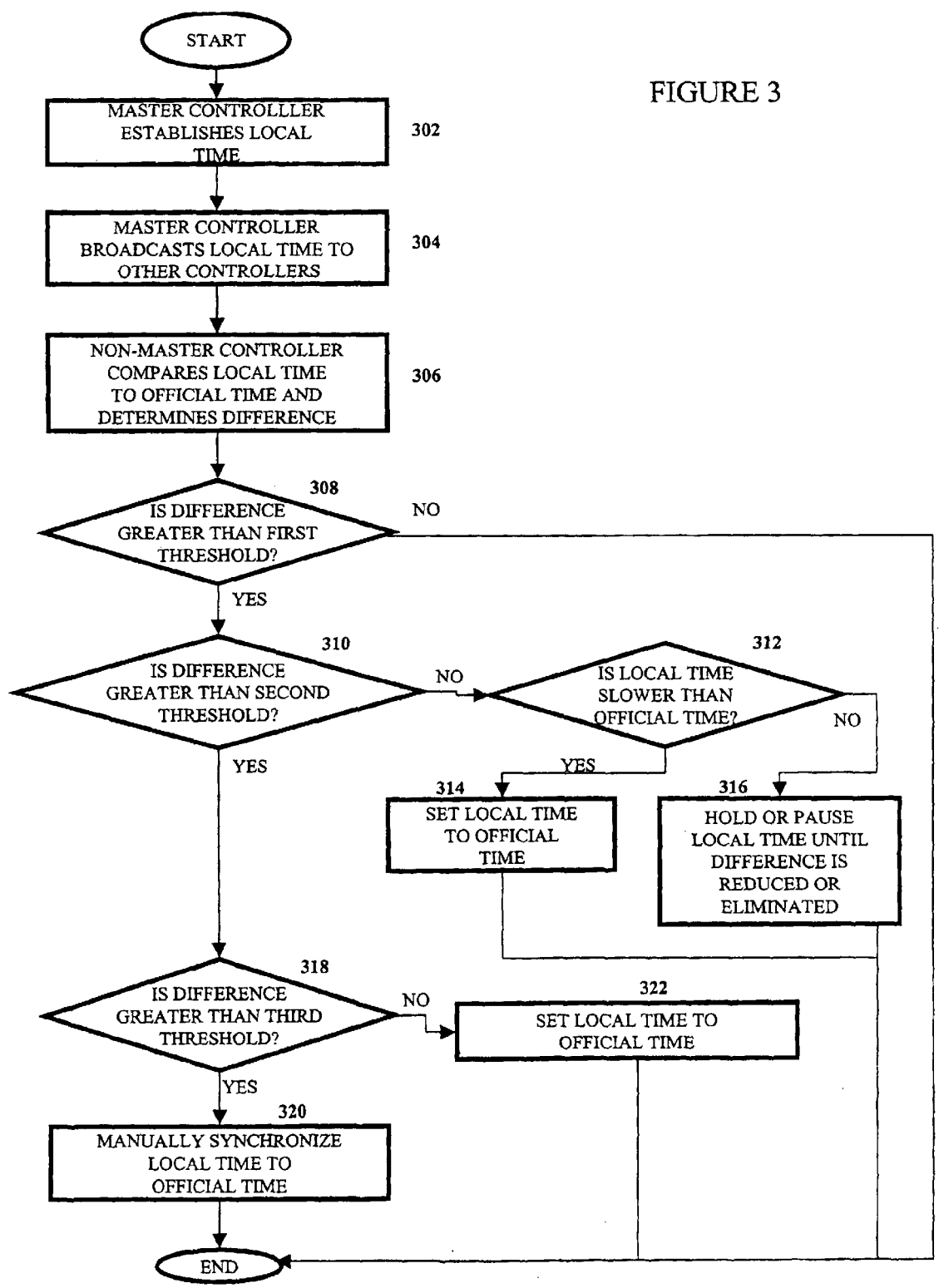
FIG. 3 is an illustration of one embodiment of a method to synchronize the time of a plurality of controllers with the master controller.

Referring to FIG. 3, step 302, in the preferred embodiment, one of the controllers, such as a master controller 104, establishes a local time, then in step 304, broadcasts the local time to the other controllers, i.e., the non-master controllers, as the official time. The received official time is used by the non-master controllers 104 as a reference that may be used to synchronize the local time if needed. In one embodiment, step 306, the received official time is compared with the local time of the non-master controller 104. The comparison preferably includes determining the difference between the official time and the local time. If the time difference exceeds a first threshold, e.g., three minutes, then the local time may be synchronized with the official time, step 314. If the time difference is less than the first threshold then it may be determined that no synchronization is necessary, and operation may continue.

If synchronization is determined to be needed, then, in one embodiment, automatic synchronization may be performed by setting the local time equal to the official time. In an alternative embodiment, a determination may be made regarding whether the local time is faster or slower then the official time, step 312. If the local time is slower, then the local time may be set equal to the official time and operation continues, step 314. If local time is faster than the official time, the local time may be held, or paused, until the time difference has been reduced or eliminated, step 316. For example, in one embodiment, the time difference between the local time and the official time is determined. If the local time is paused for synchronization, then the local time base signal, generated by the oscillator 112, is used to determine an elapsed time since the local time was held. Once the elapsed time is equal to, or within a threshold of the time difference, the local clock may resume updating the local time. This embodiment has the advantage of not needing additional updates of the official time to synchronize the local time. Alternatively an updated official time may be used to determine when the elapsed time since the local time was paused, is equal to, or within a threshold of the time difference. When the official time is equal to, or within a range of the local time, updates of the local time may continue again.

In addition, if the comparison of the local time and official time, step 310, indicates the local time is faster than the official time by more than a second threshold, e.g., six minutes, where the second threshold is greater than or equal to the first threshold, then the local time may be set to the official time instead of holding the local time, step 322.

In one embodiment, if the difference between the official time and the local time, step 318, is greater than a third threshold, e.g., one hour, which is greater than or equal to the first and/or second threshold, then the local time may be manually synchronized, step 320. A service tool (not shown) may be used to manually synchronize the local time. That is, if the time difference exceeds the third threshold, a determination may be made that indicates the controller 104 is either new to the system (e.g., a replacement part), or is faulty. In either case, a service tool may be used by an operator or service technician to synchronize the local time of the controller 104 to ensure proper operation from thereon, or if need be, to replace the controller 104.

Figure 4:
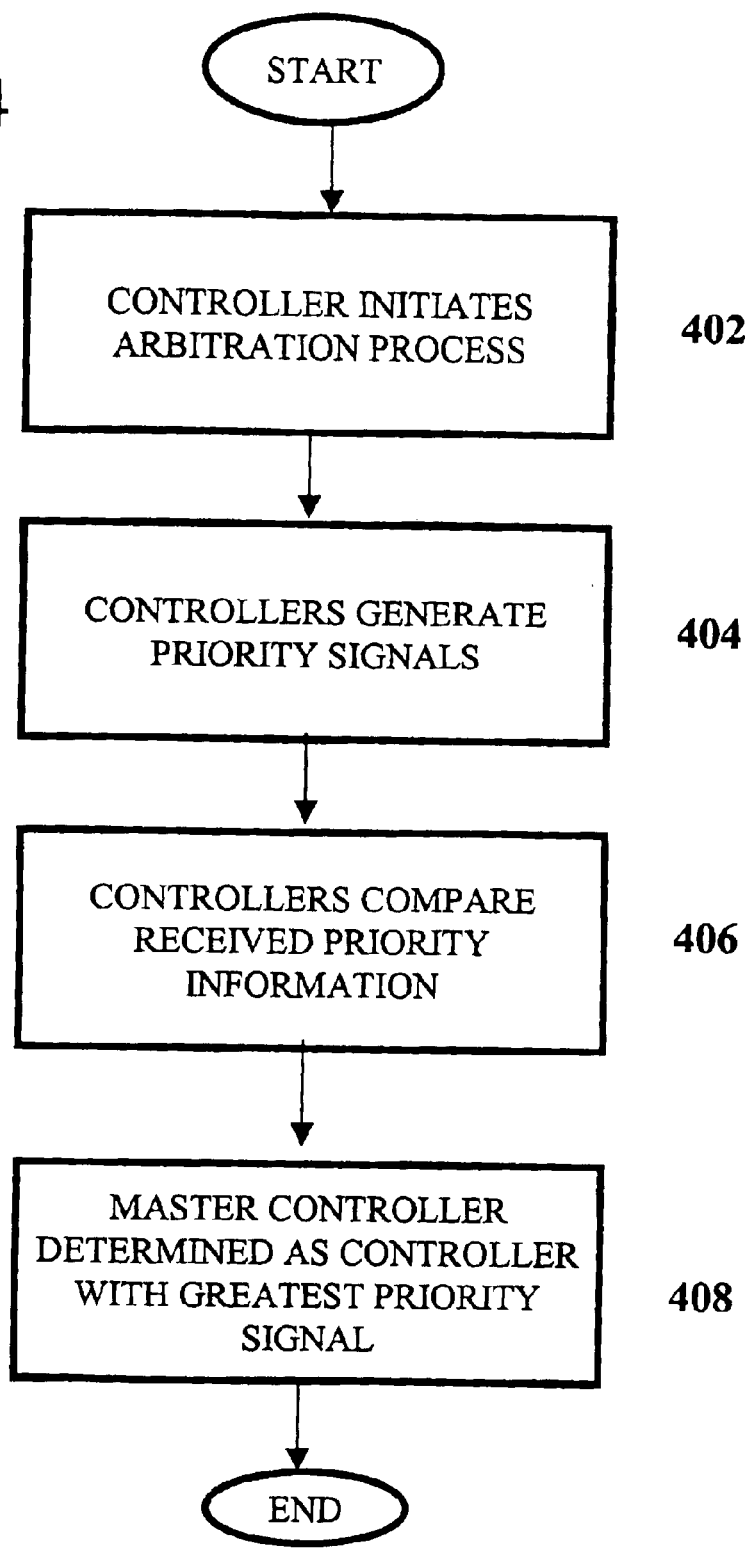
FIG. 4 is an illustration of one embodiment of a method to establish a master controller.

In one embodiment, a master controller 104 is established when the processing system 102 is initialized. Any controller 104 may be established as the master controller 104. However, in the preferred embodiment, the master controller 104 is able to establish the operating characteristic of the machine, e.g., whether the machine is operating, without assistance from any other controller 104. Referring to FIG. 4, the master controller 104 may be determined through an arbitration process. The arbitration process may be initiated by any of the controllers 104, step 402. For example, as a controller 104 is being initialized, the controller 104 may generate an arbitration signal. In one embodiment, the arbitration signal may include a single binary bit that indicates the initiation of arbitration when it is set. In an alternative embodiment, the arbitration signal is a priority signal indicating a characteristic of the controller 104. For example, the controller characteristic may include attributes indicative of the controllers ability to establish whether the machine is operating, or whether the controller is connected to a user interface (e.g., a display, or keypad). In one embodiment, when the arbitration signal does not include any controller characteristics, then the controller 104 that generated the arbitration signal also generates a priority signal, step 404. In one embodiment, once the arbitration signal is received by a controller 104, the controller 104 compares the information contained in the received priority signal with its own priority information, step 406. If the received priority is higher, then the controller 104 will not generate its own priority signal. The receiving controller 104 will not generate its own priority signal in this instance because the controller 104 recognizes that there is a higher priority controller 104 available to be the master controller 104. Therefore, the controllers 104 compare the received priority information with their priority information, step 406. The controllers 104 recognize the master controller 104 as the controller 104 that generated the highest received priority signal, step 408. A controller 104 recognizes itself as the master controller 104, based upon having the highest priority of any received priority signal. In the event no other priority signals are received, and there are no apparent communication failures, the controller 104 also recognizes itself as the master controller 104. In an alternative embodiment, each controller does generate its priority signal, regardless of the priority signals received up to that point, step 404. Each controller 104 compares the priority signals received with its own priority signal, step 406. If the receiving controllers priority is greater than all the other priority signals received, then the receiving controller 104 establishes itself as the master controller 104, step 408. For example, the controller 104 may compare the characteristics included in the priority signal with its own controller characteristics and, determine which controller 104 is of higher priority. For example, the priority information may simply be whether the controller 104 is able to directly establish the operating characteristic, e.g., machine operation by being directly connected to an engine speed sensor. In this case, then if one controller 104 is unable to directly establish the machine is operating and another controller is able to, then the controller 104 being able to directly establish machine operation will be of higher priority. If one or more of the received priority signals indicates another controller 104 is better suited to be the master controller 104, the controller 104 recognizes that another controller 104 will become the master controller. The controller 104 that determines to become the master controller 104 then begins the responsibilities of the master controller 104, such as distributing the appropriate time management signals, e.g., the official time.

In the preferred embodiment, the master controller 104 generates two time management signals, the official time, and the operating characteristic signal. The master controller 104 establishes the operating characteristic, and responsively determines whether the machine is operating. In the preferred embodiment, the master controller 104 periodically broadcast the operating characteristic signal to the non-master controllers 104, e.g. once per second.

In one embodiment, the master controller, using the local clock 108, updates a local time, based upon a local time base signal generated by a local oscillator 112, in response to the machine operating. The master controller then periodically broadcasts the official time, i.e., the local time of the master controller, to the other controllers 104 to use for synchronization purposes if need be. For example, the official time may be broadcast once a minute. Therefore, each controller 104, using a local clock 108, determines and maintains a local time, and uses the official time generated by the master controller 104, for synchronization purposes only if necessary.

INDUSTRIAL APPLICABILITY

The present invention includes a method and apparatus of managing time for a processing system located on a machine. The processing system includes a plurality of controllers and a communication network connecting each of the controllers. Each of the controllers has a local clock. The method includes the steps of establishing an operating characteristic of the machine, determining whether to update a local time in response to the operating characteristic, and updating the local time using the local clock in response to the update determination.

In the preferred embodiment, on power up, an arbitration process is initiated by one or more of the controllers 104. For example, on power up, a controller 104 may send out an arbitration signal indicating the initiation of arbitration. The controllers 104 may respond by generating a priority signal indicative of one or more characteristics of the controller 104. Each controller 104 receives the generated priority signals and determines whether it should become the master controller or remain a non-master controller 104. The controller 104 that becomes the master controller 104 then begins to establish an operating characteristic indicative of whether the machine is operating. The master controller may be connected to an element such as an engine speed sensor 114. Therefore, the master controller will receive an operating characteristic signal, e.g., engine speed signal. The operating characteristic signal may be received from an engine speed sensor 114, key switch, engine oil pressure, alternator signal, or other signal indicative of machine operation. The master controller 104 generates an operating characteristic signal which includes data indicative of the operating characteristic. The master controller 104 also updates a local time, as do the other controllers 104, in response to the operating characteristic. In practice, the local clock of each controller 104 updates the local time. For example, regarding the master controller 104, when an engine speed sensor signal indicates the engine has begun running, the local clock begins updating the local time, and continues updating until the engine speed sensor signal indicates the engine has stopped running. The master controller 104 broadcasts an official time signal, preferably less frequently than the operating characteristic signal.

The non-master controllers 104 determines and maintain a local time. The non-master controllers 104 establish an operating characteristic. For example, they receive the operating characteristic signal which contains the data indicative of the operating characteristic from the master controller 104. Alternatively, the controllers 104 may also be connected to an element, such as an engine speed sensor 114, that generates an operating characteristic signal. In this case, the controller 104 may directly establish the operating characteristic of the machine independent of receiving an operating characteristic signal from the master controller 104. The non-master controllers 104 update the local time when the operating characteristic indicates the machine is operating, and continue to update the time until the operating characteristic indicates the machine is not operating. The resolution of the local time generated by the local clock is based upon the resolution of the local time base signal generated by a local oscillator 112.

The non-master controller 104 will receive the official time from the master controller 104. The non-master controller 104 will compare the official time with the local time to determine whether the local time needs to be synchronized. Synchronization may be necessary because the local oscillators associated with each local clock may be different between controllers, leading to potential time discrepancies over extended periods of time. However, synchronization every time the official time is received is unnecessary and may place an undesirable amount of burden on the controller 104 to continuously synchronize the local time. Therefore, using a synchronization strategy enables the controllers 104 to ensure a coordinated time while not overly burdening the processing capabilities of the controller 104. If the local time is within a first threshold, e.g., three minutes, of the official time, then synchronization may be deemed unnecessary.

Therefore if the time difference between the official and local time is within the first threshold, no synchronization is performed. If the time difference if greater than the first threshold then the local time may be synchronized to the official time. The synchronization strategy used may vary. In one embodiment, if the local time is faster than the official time, then the local time may be held, or paused, until the official time catches up. Holding the local time in this manner helps to prevent inverting the timing of two events. However if the local time is slower than the official time, the local time may just be set equal to the official time. Alternatively, the local time may be accelerated, e.g., use exaggerated time updates, to catch up to the official time.

In one embodiment, if the time difference is too great, then the local time may be manually synchronized, e.g., by a service tool. In this case manual synchronization may be desired if the controller 104 was just located in the processing system 102, or the controller 104 may be experience a failure.

Utilizing an operating characteristic signal to determine whether to begin or continue updating and maintaining a local time consumes less bandwidth on the communication network because the machine operating signal may be a binary value whereas an official time value may require larger data packets to be transmitted. Therefore, a machine operating signal may be sent frequently, e.g., once a second or upon change, and the official time may be sent less frequently, e.g., every few minutes. In addition, because the controllers establish and maintain a local time based upon a local clock, the official time does not need to be generated often. In one embodiment, the official time is only generated as often as anticipated oscillator 112 variations would cause a local time to vary from the official time by more than a desired threshold. Due to the accuracy of the oscillators, the official time may therefore be generated less often than systems having central clocking facilities, thereby reducing the communication burden while increasing the timing resolution.

In one embodiment of the present invention, the local clock may be updated when the machine is operating, then a separate time indicator may be maintained to track particular operations or characteristics of the machine, such as the time the machine spent in a particular gear, or in a particular geographic area. Alternatively, the operating characteristic established by the present invention may be, or include, the direction of travel of the machine, e.g., forward or reverse, or the location of the machine. The local clock may then be updated when the machine is moving in the forward direction, or the reverse direction, or the machine is located in a particular area, such as a particular county or state.

Other aspects, objects and advantages of the present invention can be obtained from a study of the drawings, the disclosure and the appended claims.

What is claimed is:

1. A method of managing time for a controller located in a processing system on a machine, the processing system including a plurality of controllers, each controller having a local clock, and a communication network connecting each of the controllers, including the steps of:

establishing an operating characteristic of the machine;

determining whether to update a local time in response to said operating characteristic; and updating said local time using the local clock in response to said update determination.

2. A method, as set forth in claim 1, further comprising the steps of:

receiving an official time;

determining a difference between said official time and said local time; and, determining whether to synchronize said local time with said official time in response to said time difference.

3. A method, as set forth in claim 2, wherein the step of establishing said operating characteristic further comprises the step of receiving the operating characteristic, said operating characteristic being indicative of a machine being operated.

4. A method, as set forth in claim 2, wherein the step of establishing said operating characteristic further comprises the step of receiving the operating characteristic, said operating characteristic being indicative of a engine being operated.

5. A method, as set forth in claim 2, wherein the step of determining whether to synchronize said local time further comprises the step of determining to synchronize said local time with said official time in response to said time difference being greater than a first threshold.

6. A method, as set forth in claim 5, further comprising the step of establishing a master controller of the processing system.

7. A method, as set forth in claim 6, wherein the step of receiving said official time further comprises the step of receiving said official time from said master controller.

8. A method, as set forth in claim 7, wherein the step of establishing said operating characteristic further comprises the step of receiving an operating characteristic signal from said master controller.

9. A method, as set forth in claim 6, wherein the step of establishing said master controller further comprises the step of participating in an arbitration process among the controllers.

10. A method, as set forth in claim 9, further comprising the step of receiving an arbitration signal.

11. A method, as set forth in claim 10, generating a priority signal in response to receiving said arbitration signal, said priority signal being indicative of at least one controller characteristic.

12. A method, as set forth in claim 11, further comprising the steps of:

receiving at least one priority signal;

determining whether to become the master controller in response to said received at least one priority signal.

13. A method, as set forth in claim 10, further comprising the step of initiating said arbitration process in response to receiving power.

14. A method, as set forth in claim 10, wherein the step of initiating said arbitration further comprises the step of initiating said arbitration process in response to failing to receive one of said official time and said operating characteristic.

15. An apparatus configured to manage time on a processing system located on a machine, comprising:

a plurality of controllers on the machine;

a local clock located on each controller and configured to establish a local time;

a communication network connected to said controllers; and wherein each of said plurality of controllers is configured to establish an operating characteristic of the machine, determine whether to update said local time, using said local clock, in response to said operating characteristic, and updating said local time in response to said update determination.

16. An apparatus, as set forth in claim 15, wherein said plurality of controllers being further adapted to establish a master controller in response to an arbitration process, the remaining controllers being non-master controllers.

17. An apparatus, as set forth in claim 16, wherein each of said non-master controllers receives an official time signal from said master controller.

18. An apparatus, as set forth in claim 17, wherein each of said non-master controllers is further adapted to determine a difference between said official time and said local time and determine whether to synchronize said local time with said official time in response to said time difference.

19. An apparatus, as set forth in claim 18, wherein each of said non-master controllers receives an operating characteristic signal, indicative of said operating characteristic, from said master controller.

20. An apparatus, as set forth in claim 19, wherein said operating characteristic is indicative of at least one of a machine operation and an engine operation.

21. An apparatus, as set forth in claim 20, wherein each of said non-master controllers is further adapted to synchronize said local time with said official time in response to said difference being greater than a first threshold.

22. An apparatus, as set forth in claim 21, wherein at least one of said non-master controllers initiates said arbitration in response to failing to receive one of said official time signal and said operating characteristic signal.

23. An apparatus, as set forth in claim 22, wherein each said non-master controller generates a priority signal indicative of said controllers capability.

24. An apparatus, as set forth in claim 23, wherein each said non-master controller is further adapted to determine whether to be the master controller in response to receiving said priority signals.

25. A method of managing time for a processing system located on a machine, the processing system including a plurality of controllers, each controller having a local clock, and a communication network connecting each of the controllers, including the steps of:

establishing an operating characteristic of the machine;

determining whether to update a local time on each of the controllers in response to said operating characteristic; and updating said local time, using the local clock, in response to said update determination.

26. A method, as set forth in claim 25, further comprising the steps of:

establishing an official time;

determining a difference between said official time and said local time; and, determining whether to synchronize said local time with said official time in response to said time difference.

27. A method, as set forth in claim 26, further comprising the step of establishing a master controller, the other controllers being non-master controllers.

28. A method, as set forth in claim 27, wherein the step of establishing said operating characteristic further comprises the step of delivering an operating characteristic to each of the non-master controllers, said operating characteristic being indicative of the machine being operated.

29. A method, as set forth in claim 27, wherein the step of establishing said operating characteristic further comprises the step of delivering an operating characteristic signal to each of the non-master controllers, said operating characteristic being indicative of the engine being operated.

30. A method, as set forth in claim 27, wherein the step of determining whether to synchronize said local time further comprises the step of synchronizing said local time with said official time in response to said time difference being greater than a first threshold.

31. A method, as set forth in claim 30, wherein the step of receiving said official time further comprises the step of receiving said official time from said master controller.

32. A method, as set forth in claim 31, wherein the step of establishing said operating characteristic further comprises the step of receiving an operating characteristic signal from said master controller.

33. A method, as set forth in claim 32, wherein the step of establishing said master controller further comprises the step of arbitrating among the controllers.

34. A method, as set forth in claim 33, wherein the step of arbitrating further comprises the steps of:

at least one of the controllers initiating said arbitration; and said at least one controller generating an arbitration signal in response to said intitiation.

35. A method, as set forth in claim 34, further comprising the step of generating a priority signal in response to receiving said arbitration signal, said priority signal being indicative of at least one controller characteristic.

36. A method, as set forth in claim 35, further comprising the steps of:

receiving said priority signals;

determining whether to become the master controller in response to said received priority signals.

37. A method, as set forth in claim 36, wherein the step of initiating said arbitration further comprises the step of initiating said arbitration process in response to receiving power.

38. A method, as set forth in claim 37, wherein the step of initiating said arbitration further comprises the step of initiating said arbitration process in response to failing to receive one of said official time and said operating characteristic.

* * * * *